United States Patent
Shaffer et al.

(10) Patent No.: US 8,782,144 B2
(45) Date of Patent: Jul. 15, 2014

(54) CONTROLLING THE DISTRIBUTION OF MESSAGES

(75) Inventors: Shmuel Shaffer, Palo Alto, CA (US); Amit Barave, Sunnyvale, CA (US); Mukul Jain, San Jose, CA (US); Alan Darryl Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 879 days.

(21) Appl. No.: 12/511,681

(22) Filed: Jul. 29, 2009

(65) Prior Publication Data

US 2011/0029615 A1 Feb. 3, 2011

(51) Int. Cl.
*G06F 15/16* (2006.01)

(52) U.S. Cl.
USPC .......................................................... 709/206

(58) Field of Classification Search
USPC .......................................................... 709/206
See application file for complete search history.

(56) References Cited

U.S. PATENT DOCUMENTS

| | | | | |
|---|---|---|---|---|
| 6,721,784 B1 * | 4/2004 | Leonard et al. | | 709/206 |
| 6,912,656 B1 * | 6/2005 | Perlman et al. | | 713/170 |
| 6,957,248 B2 * | 10/2005 | Quine et al. | | 709/206 |
| 7,149,893 B1 * | 12/2006 | Leonard et al. | | 713/154 |
| 7,228,334 B1 * | 6/2007 | Jordan, Jr. | | 709/206 |
| 7,577,711 B2 * | 8/2009 | McArdle | | 709/207 |
| 7,590,693 B1 * | 9/2009 | Chan et al. | | 709/206 |
| 7,673,006 B2 * | 3/2010 | Bhogal et al. | | 709/206 |
| 7,844,671 B1 * | 11/2010 | Lawler et al. | | 709/206 |
| 7,877,454 B1 * | 1/2011 | Hunter | | 709/207 |
| 8,160,566 B2 * | 4/2012 | Angwin et al. | | 455/420 |
| 8,230,018 B2 * | 7/2012 | Sistla | | 709/206 |
| 8,250,150 B2 * | 8/2012 | Beck et al. | | 709/206 |
| 8,281,372 B1 * | 10/2012 | Vidal | | 726/5 |
| 2004/0221012 A1 | 11/2004 | Heumesser | | |
| 2005/0033813 A1 * | 2/2005 | Bhogal et al. | | 709/206 |
| 2006/0195527 A1 * | 8/2006 | Allen et al. | | 709/206 |
| 2007/0088848 A1 * | 4/2007 | Chen et al. | | 709/238 |
| 2007/0185993 A1 * | 8/2007 | McArdle | | 709/225 |
| 2007/0226367 A1 * | 9/2007 | Cai et al. | | 709/238 |
| 2007/0293195 A1 * | 12/2007 | Angwin et al. | | 455/412.2 |
| 2008/0288597 A1 * | 11/2008 | Christensen et al. | | 709/206 |
| 2009/0031393 A1 * | 1/2009 | Denner et al. | | 726/1 |
| 2009/0083384 A1 * | 3/2009 | Bhogal et al. | | 709/206 |
| 2009/0164588 A1 * | 6/2009 | D'Amato et al. | | 709/206 |
| 2009/0177744 A1 * | 7/2009 | Marlow et al. | | 709/204 |
| 2009/0214034 A1 * | 8/2009 | Mehrotra et al. | | 380/255 |
| 2009/0249451 A1 * | 10/2009 | Su et al. | | 726/5 |
| 2010/0042690 A1 * | 2/2010 | Wall | | 709/206 |
| 2010/0250686 A1 * | 9/2010 | O'Sullivan et al. | | 709/206 |
| 2010/0275021 A1 * | 10/2010 | Kristiansen et al. | | 713/171 |
| 2012/0324547 A1 * | 12/2012 | Vidal | | 726/4 |

\* cited by examiner

*Primary Examiner* — Imad Hussain
(74) *Attorney, Agent, or Firm* — Tucker Ellis LLP

(57) ABSTRACT

In an example embodiment, described herein is an apparatus that comprises a user interface, a communication interface, and logic coupled to the user interface and communication interface. The logic is configured to receiving a request via the user interface to forward a message to a recipient to determine whether distribution of the message is restricted to a group. The logic is further configured to determine whether the recipient is a member of the group responsive to determining distribution of the message restricted to a group. The logic is configured to send the message to the recipient via the communication interface responsive to determining the recipient is a member of the group.

8 Claims, 3 Drawing Sheets

CONTROLLING THE DISTRIBUTION OF MESSAGES

TECHNICAL FIELD

The present disclosure relates generally to electronic communications.

BACKGROUND

Electronic messages such as electronic mail (email), text messaging such as Short Messaging Service (SMS), instant messaging (IM), voicemail, etc. are a popular form of communications. Two popular functions of these types of communication are the capability of sending messages to a group of people and the ability to forward messages. User agents provide user friendly functions to forward and reply to messages. Address books can be employed in order to provide a convenient way to specify the addresses of the recipients and to create and process groups.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
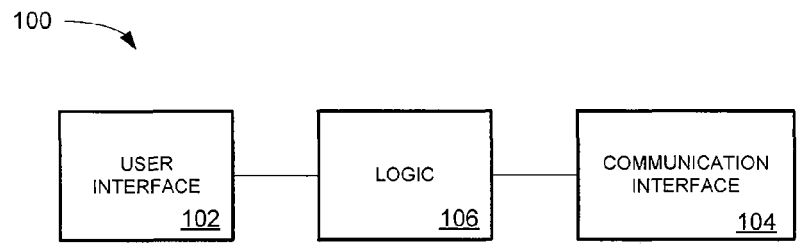
FIG. 1 illustrates an example of an apparatus configured to process a message where forwarding of the message is restricted to a group.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus, comprising a user interface, a communication interface, and logic coupled to the user interface and communication interface. The logic is responsive to receiving a request via the user interface to send a message to a recipient and to limit distribution of the message to a group of recipients to associate data with the message indicating the message is a private message and data representative of the group into the message. The logic is further configured to send the message to the recipient via the communication interface.

In accordance with an example embodiment, there is disclosed herein an apparatus comprising a user interface, a communication interface, and logic coupled to the user interface and communication interface. The logic is configured to receiving a request via the user interface to forward a message to a recipient to determine whether distribution of the message is restricted to a group. The logic is further configured to determine whether the recipient is a member of the group responsive to determining distribution of the message restricted to a group. The logic is configured to send the message to the recipient via the communication interface responsive to determining the recipient is a member of the group.

In accordance with an example embodiment, there is disclosed herein a method for limiting the forwarding of a message. The method comprises receiving a request to forward a message to a recipient. A determination is made whether distribution is of the message is restricted to a group of recipients. If the distribution of the message is restricted to a group of recipients, a determination is made whether recipient is a member of the group of recipients. If the recipient is a member of the group, the message is forwarded to the recipient.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, when a person is addressing a voicemail or email message, they are given the option to mark it private. If they mark it private, they are also given the option to specify who the recipient is allowed to forward the message to. If the message sender does not specify anyone then the recipient cannot forward that message to anyone.

In an example embodiment, if the sender of the message is using a Graphical User Interface (GUI) client, once they choose to mark the message as private, the User Interface (UI) will then present a list of groups that the sender is a member of. These can be voicemail distribution lists, LDAP (Lightweight Directory Access Protocol) groups, mailer lists, and/or groups that are defined by external social networking applications. Users and administrators can define what groups are presented in this UI. The sender then selects individual people or groups that the recipient of the private message is allowed to forward it on to (if they so choose). If the sender of the message is using the voicemail TUI/VUI (telephone user interface/voice user interface), once they choose to mark the message as private, the voicemail system will play a list of groups that the recipient is allowed to forward to. The list of groups is the-same as the ones presented in the GUI client described above. The sender then selects from that list using DTMF (Dual Tone Multi-Frequency) input or voice commands processed by a speech recognition system. The sender then sends the message. The recipient after receiving the private message can record an introduction to the message before forwarding it on to a member the group that was identified by the original sender.

The following illustrates an example of the operations of a system in accordance with an example embodiment. As a message originator selects the forward option she hears the same prompts as with existing systems plus a new prompt giving her the option of allowing forwarding within a private group. If the user selects this option the user is given the options of entering the addresses (via DTMF input/speech commands) of the group or the team members who are allowed to hear the message or just enter a group/"family"/team name or number. It should be noted that if a user does not want to use this new feature, their user interface does not change.

As the message gets forwarded within the group and the overall message chain becomes longer, users may not listen to all of the voicemail chain and forget that the originator requested to keep the information within the group (or "within the family"). If that user attempts to forward the message to another user who is not within the group, the system alerts this user with a prompt such as "I am sorry but you cannot forward this private message to people who are not in the group".

Alternatively, the system may provide a prompt to alert the user if the message is being forwarded to someone who is not a member of the group. The system confirms that the user wishes to proceed with forwarding the message, and if so, the message is forwarded all other recipients that belong to the group, but not the person who does not belong to the group.

Although this example mostly focuses on the voicemail scenario, those skilled in the art can readily appreciate that these principles can be applied to any form of messaging that allows for the sending of private messages (such as email, IM (Instant Message, text messages, Short Message Service "SMS" text messages, etc). Therefore, the principles described herein should not be construed as restricted to a voice mail environment.

FIG. 1 illustrates an example of an apparatus 100 configured to process a message where forwarding of the message is restricted to a group. Apparatus 100 comprises a user interface 102, a communication interface 104, and logic 106 coupled to the user interface and communication interface. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, logic 106 is responsive to receiving a request via user interface 102 to send a message to a recipient and to limit distribution of the message to a group of recipients to associate data with the message indicating the message is a private message and data representative of the group into the message. The message may suitably be any type of message. For example the message may be compatible with Simple Mail Transfer Protocol (SMTP), Messaging Application Programming Interface (MAPI), Internet Message Access Protocol (IMAP), Multipurpose Internet Mail Extensions (MIME), etc. Logic 106 is configured to send the message to the recipient via communication interface 104.

In an example embodiment, the message is received via user interface 102. For example, a user may key in the message using an application such as electronic mail (email), Instant Messaging (IM), Simple Message Service (SMS) text, Multi-Media Message Service (MMS), or the user may employ an audio interface to record a voice mail message, etc. The message may stored in a memory (see e.g. memory 202 in FIG. 2) while being processed.

In an example embodiment, logic 106 is configured to receive group data from user interface 102. For example, the user may select a predefined group using a pointing device, key in or provide an audio signal indicating the name of the group. In particular embodiments, a user may retrieve social networking data via communication interface 104 and select individual recipients or groups who are allowed to receive the message. Note that individual recipients or groups who are allowed to receive the message may not be recipients of the message. That is control of the message can be asserted over the message such that a recipient of the message can forward the message to a third party recipient who was not a recipient of the original message provided that the third party recipients is a member of a group allowed to receive the message.

In an example embodiment, a user can employ user interface 102 to dynamically create a recipient group. For example, a user may select individual recipients to receive the message. Logic 106 will associate data representative of the individual recipients with the group of recipients allowed to receive forwarded messages. It should be noted that the original list of recipients to which the original message is addressed can either be the same as the group of people to whom the message can be forwarded (with or without additional comments) or to a subset of a broader group of people to whom the message (with or without additional comments) may be forwarded.

In an example embodiment, logic 106 is configured to insert the data representative of the group into the message. For example the message may suitably comprise a header. The data representative of the group can be inserted into the header of the message. In particular embodiments, the data may be inserted into the message as envelope information and/or metadata. As another example, the data may be inserted into an X-header added to the message.

In an example embodiment, logic 106 is configured to send data representative of the group with data identifying the message to an external device via the communication interface. For example, the data may be sent to an email server with information identifying the message so that the email server can control distribution of the message.

In an example embodiment, apparatus 100 is employed for receiving a message having associated data for controlling distribution and forwarding the message accordingly. For example, logic 106 is configured to receiving a request via user interface 102 to forward a message to a recipient. Logic 106 determines whether distribution of the message is restricted to a group. If distribution of the message is restricted to a group, logic 106 determines whether the recipient designated to receive the forwarded message is a member of the group allowed to receive the message. Logic 106 is configured to forward the message to the recipient via communication interface 104 responsive to determining the recipient is a member of the group.

Figure 2:
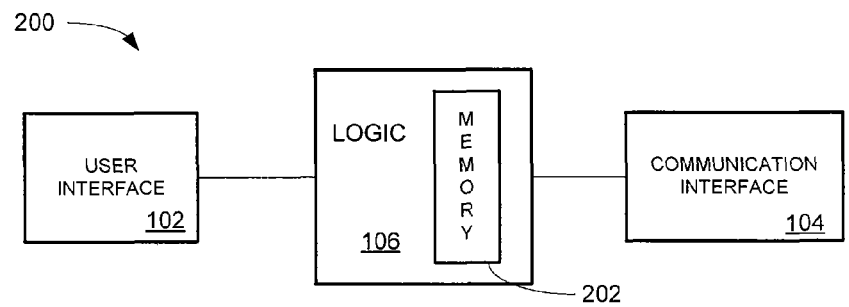
FIG. 2 illustrates an example of the apparatus in FIG. 1 further comprising a memory for storing the message and/or data indicating forwarding of the message is restricted to a group.

In an example embodiment 200, the message to be forwarded is retrieved from a memory 202 associated with logic 106 which is illustrated in FIG. 2. For example, when the message is first received, it may be received via communication interface 104 and stored in memory 202. When data is received via user interface 102 to forward the message, logic 106 retrieves the message from memory 202, and if forwarding of the message is permitted, the message is forwarded to a recipient via communication interface 104.

In an example embodiment, logic 106 determines whether distribution is restricted to a group based on data stored within the message. For example logic 106 may extract the data from envelope information, meta data, header information and/or a combination thereof. In another example embodiment, logic 106 is configured to communicate with an external device via communication interface 104 to obtain data representative of group members. For example, as will be discussed herein with reference FIG. 3 infra, forwarding data may reside on a server. In an example embodiment, the data is obtained from a social networking website. In yet another example embodiment, data may be employed from a combination of the aforementioned sources.

In an example embodiment, data may be received via user interface 102 to forward the message to multiple sources. For example, data may be received requesting the message be forwarded to a first recipient and a second recipient (or any number of recipients, two are illustrated in this example merely for ease of illustration). Logic 106 determines whether the message can be forwarded to each designated recipient (whether the recipient is a group recipient or an individual recipient). For example if the first recipient is allowed to receive a forwarded version of the message but the second recipient is not, the message is forwarded only to the first recipient. If both the first and second recipients are allowed to receive a forwarded version of the message, then both will receive the forwarded message.

Figure 3:
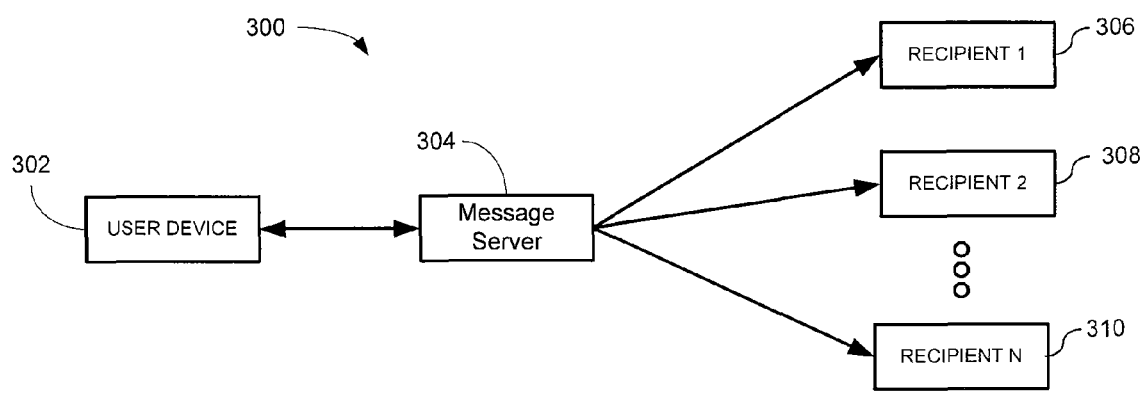
FIG. 3 illustrates an example of a system configured for forwarding messages in accordance with an example embodiment.

FIG. 3 illustrates an example of a system 300 configured for forwarding messages in accordance with an example embodiment. The system comprises a user device 302, message server 304, a plurality of potential recipients 306, 308, 310 of a forwarded message. In an example embodiment, the logic for implementing the forwarding functionality can be implemented in user device 302 or in the messaging server 304". A user can employ a user interface to indicate that the user desires to forward a message. The message may be stored either at user device 302 or at message server 304. User device 302 processes the request and instructs message server 304 how to forward the message. For example if recipients 306 and 308 are designated as recipients of the forwarded message, user device 302 or server 304 determines whether each individual recipient is permitted to receive the forwarded message and instructs message server 304 to forward the message accordingly. For example, if recipient 306 is permitted to receive the message but recipient 308 is not, the message is forwarded only to recipient 306.

In another example embodiment, messages and data representative of a group permitted to receive a forwarded version of the message (for example the message may be edited before being forwarded) are stored at message server 304. When message server receives a request to forward a message, message server 304 verifies from data associated with the message whether the designated recipients are allowed to receive the forwarded message. In other example embodiments, data representative of a group allowed to receive the forwarded message is stored at user device 302 while the message is stored at message server 304, and/or data representative of a group allowed to receive the forwarded message is stored at message server 304 while the message is stored at user device 302.

Figure 4:
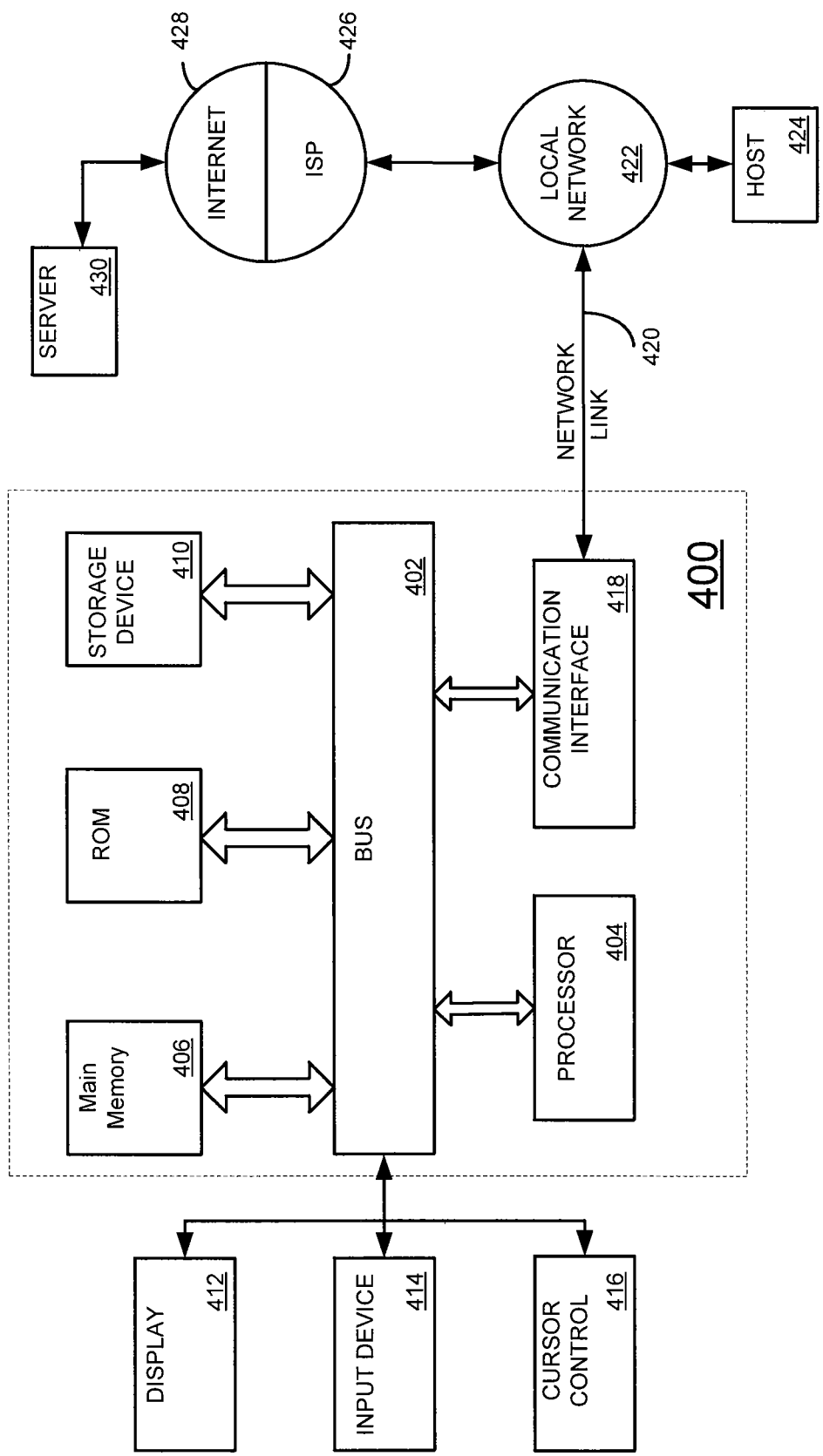
FIG. 4 illustrates an example of a computer system configured to implement an example embodiment.

FIG. 4 illustrates an example of a computer system 400 configured to implement an example embodiment. For example, computer system 400 can be configured the functionality of logic 106 (FIGS. 1 and 2) described herein. Computer system 400 may also be employed to implement user device 302 (FIG. 3) and Message Server 304 (FIG. 3).

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412 such as a cathode ray tube (CRT) or liquid crystal display (LCD), for displaying information to a computer user. An input device 414, such as a keyboard including alphanumeric and other keys is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g. x) and a second axis (e.g. y) that allows the device to specify positions in a plane. Display 412, input device 414 and/or cursor control 412 may be employed to implement user interface 102 (FIGS. 1 and 2). In some related embodiment the input device may include a microphone used for recording voice messages and/or a DTMF keypad. Similarly in this embodiment the display 412 may include also a speaker capable of playing out a voice message.

An aspect of the example embodiment is related to the use of computer system 400 for controlling the distribution of messages. According to an example embodiment, controlling the distribution of messages is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 404 for execution. Such a medium may take many forms, including but not limited to non-volatile media and volatile media. Non-volatile media include for example optical or magnetic disks, such as storage device 410. Volatile media include dynamic memory such as main memory 406. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data. The instructions received by main memory 406 may optionally be stored on storage device 410 either before or after execution by processor 404.

Computer system 400 also includes a communication interface 418 coupled to bus 402. Communication interface 418 provides a two-way data communication coupling computer system 400 to a network link 420 that is connected to a local network 422. For example, communication interface 418 may be a local area network (LAN) card to provide a data communication connection to a compatible LAN. As another example, communication interface 418 may be an integrated services digital network (ISDN) card or a modem to provide a data communication connection to a corresponding type of telephone line. In another example embodiment the communication interface 418 may be an IP based communication link. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communications through the worldwide packet data communication network, now commonly referred to as the "Internet" 428. As another example, network link 420 may provide a connection through local network 422 to ISP 426, Internet 428 to server 430. For example, computer system 400 may send and/or receive messages via host 424 and/or server 430.

Figure 6:
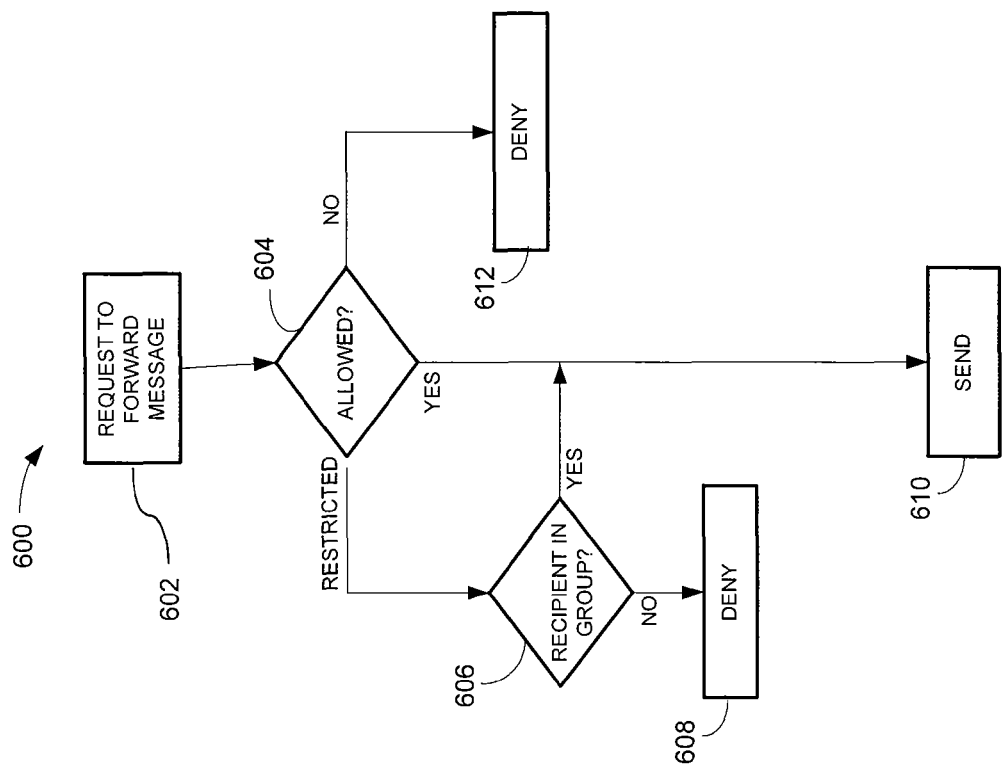
FIG. 6 illustrates an example of a method for forwarding a message with data indicating forwarding of the message is restricted to a group.
Figure 5:
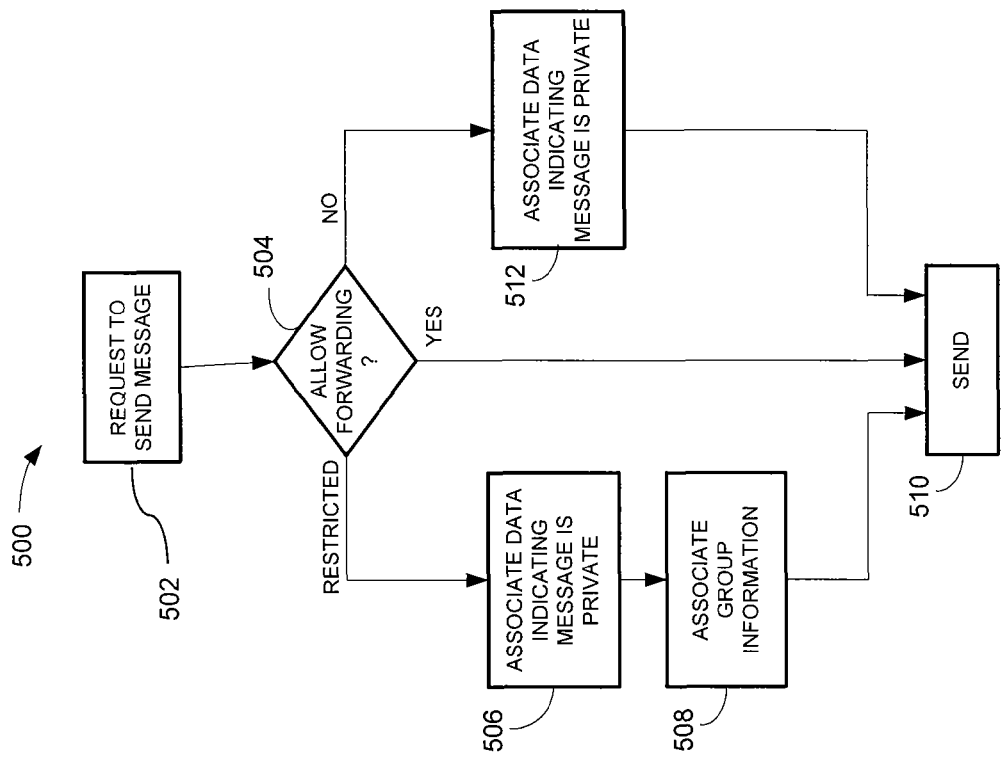
FIG. 5 illustrates an example of a method for indicating that forwarding of a message is restricted to a group.

In view of the foregoing structural and functional features described above, methodologies 500, 600 in accordance with example embodiments will be better appreciated with reference to FIGS. 5 and 6 respectively. While, for purposes of simplicity of explanation, the methodologies of FIGS. 5 and 6 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement methodologies 500, 600. The methodologies described herein are suitably adapted to be implemented in hardware, software, or a combination thereof.

FIG. 5 illustrates an example of a method 500 for indicating that forwarding of a message is restricted to a group. At 502, a request is received to send a message. The message may a message currently being composed or a stored message. In an example embodiment, the request is received via a user interface, such as user interface 102 (FIGS. 1 and 2) described herein.

At 504, it is determined whether forwarding of the message should be allowed. For example, a display may be presented on a user interface prompting a user to indicate whether the message can be forwarded and/or whether forwarding of the message should be restricted. If the message can be forwarded without any restrictions (YES), at 504 the message is sent.

If forwarding of the message is not permitted (NO), then at 512 data indicating that the message is private is associated with the message. The data may be associated with the message using any suitable technique. For example, the data may be stored separately in which case a link between the data and the message would be maintained. As another example, the data may be stored with the message, for example as envelope information and/or header information such as an X-header. At 510, the message is sent.

If forwarded of the message is to be restricted to one or more (a group) of recipients (RESTRICTED), at 506, data indicating that the message is private is associated with the message. The data may be associated with the message using any suitable technique. For example, the data may be stored separately in which case a link between the data and the message would be maintained. As another example, the data may be stored with the message, for example as envelope information and/or header information such as an X-header. In addition at 508 data is obtained identifying the group of recipients permitted to receive a forwarded version (for example the message may be edited or augmented with additional context before being forwarded) of the message. The data representative of the group of permitted to receive a forwarded version of the message is associated with the message. This information may be stored with the data indicating the message is private or may be stored elsewhere. For example, data indicating the message is private may be stored within the message while the data representative of the group permitted to receive a forwarded version of the message may be stored in a different part of the message or may be stored at a remote server. At 510, the message is sent.

FIG. 6 illustrates an example of a method 600 for forwarding a message with data indicating forwarding of the message is restricted to a group. At 602, a request is received to forward a message. For example, the request may be received by a user who received the original message, or may by a user who received a forwarded version of the original message from a recipient who received the original message. The message may be a message that was previously received and stored. In another example embodiment the message may be an edited version of the original message. In yet another example embodiment the message could contain the original message with an appended comment from the sender.

At 604, a determination is made whether forwarding of the message is allowed. The determination can be made based on data stored within the message such as envelope information, or based on data associated with the message stored remotely such as at a remote server. If forwarding of the message is allowed (YES), at 610, the message is forwarded. If forwarding of the message is not allowed (NO), at 612, forwarding of the message is denied.

If forwarding of the message is restricted to a group of recipients (RESTRICTED) at 606, a determination is made whether the recipient of the forwarded message is a member of the group permitted to receive a forwarded version of the message. If the recipient is a member of the group permitted to receive a forwarded version of the message (YES), at 610, the message is forwarded to the recipient. If the recipient is not a member of the group permitted to receive a forwarded version of the message (NO), at 608, forwarding of the message is denied. In an example embodiment, if the request to forward the message at 602 comprises a plurality of recipients and distribution of the message is restricted to a group of recipients, then 606 and where appropriate 608 or 610 is performed for each recipient It should be noted that the system described above has the advantage that it continuously updates itself to changes in group dynamics. For example assume that a restricted message is sent with forwarding permission restricted to group A. Also assume that at the time the message is sent Joe is a member of group A. After some time Joe's membership in group A is revoked and he is no longer a member of group A. If someone attempts to forward the message again, the system notifies them that it will not be sent to Joe (who was on the original distribution list) as he is no longer a member of group A.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a processor;
a non-transient memory;
a user interface operatively coupled with the processor;
a communication interface operatively coupled with the processor; and
logic operatively coupled with the user interface and communication interface;
wherein the logic is configured to receive from a recipient of an original message via the user interface a first request to send the original message to a first set of one or more recipients and wherein the logic is configured to limit forwarding of the original message from the recipient of the original message to a first group of recipients identified in group membership data of a distribution list stored in the memory;
wherein the logic is configured to receive from a recipient of a forwarded edited version of the original message via the user interface a second request to send the forwarded edited version of the original message to a second set of one or more recipients and wherein the logic is configured to limit forwarding of the forwarded edited version of the original message from the recipient of the forwarded edited version of the original message to a second group of recipients identified in the group membership data of the distribution list stored in the memory;
wherein the logic is configured to obtain the group membership data via the communication interface;
wherein the logic is configured to associate with the original message data indicating the original message is a private message and data representative of the first group of recipients;
wherein the logic is configured to associate with the forwarded edited version of the original message data indicating the forwarded edited version of the original message is a private message and data representative of the second group of recipients;
wherein the logic is configured to selectively send the original message to the first set of one or more recipients via the communication interface in accordance with the first set of one or more recipients being a member of the first group of recipients identified in group membership data; and
wherein the logic is configured to selectively send the forwarded edited version of the original message to the second set of one or more recipients via the communication interface in accordance with the second set of one or more recipients being a member of the second group of recipients identified in group membership data.

2. The apparatus set forth in claim 1, wherein the logic is configured to insert data representative of the first group of recipients into the original message.

3. The apparatus set forth in claim 2, wherein:
the original message comprises a header; and
wherein the data representative of the first group of recipients is inserted into the header of the original message.

4. The apparatus set forth in claim 1, wherein the logic is configured to send data representative of the first group of recipients with data identifying the original message to an external device via the communication interface.

5. The apparatus set forth in claim 1, wherein the logic is configured to insert data representative of the second group of recipients into the forwarded edited version of the original message.

6. The apparatus set forth in claim 5, wherein:
the forwarded version of the original message comprises a header; and
wherein the data representative of the second group of recipients is inserted into the header of the forwarded version of the original message.

7. The apparatus set forth in claim 1, wherein the logic is configured to send data representative of the second group of recipients with data identifying the forwarded version of the original message to an external device via the communication interface.

8. An apparatus, comprising:
a processor;
a non-transient memory;
a user interface operatively coupled with the processor;
a communication interface operatively coupled with the processor; and
logic operatively coupled with the user interface and communication interface;
wherein the logic is configured to obtain group membership data identifying a first group of recipients via the communication interface;
wherein the logic is configured to receive from a recipient of an original message via the user interface a first request to send the original message to a first set of one or more recipients and wherein the logic is configured to limit forwarding of the original message from the recipient of the original message to the first group of recipients identified in the group membership data of a distribution list stored in the memory;
wherein the logic obtains updated group membership data identifying an updated first group of recipients via the communication interface;
wherein the logic is configured to receive from a recipient of a forwarded original message via the user interface a second request to send the forwarded original message to a second set of one or more recipients and wherein the logic is configured to limit forwarding of the original message from the recipient of the forwarded original message to the updated first group of recipients identified in the updated group membership data of the distribution list stored in the memory;
wherein the logic is configured to associate with the original message data indicating the original message is a private message and data representative of the first group of recipients;
wherein the logic is configured to associate with the forwarded original message data indicating the forwarded original message is a private message and data representative of the updated first group of recipients;
wherein the logic is configured to selectively send the original message to the first set of one or more recipients via the communication interface in accordance with the first group of recipients identified in group membership data;
wherein the logic is configured to selectively send the forwarded original message to the second set of one or more recipients via the communication interface in accordance with the updated first group of recipients identified in updated group membership data; and wherein the logic is configured to selectively send a forwarded edited version of the original message to a second set of one or more recipients different than the first set of one or more recipients via the communication interface in accordance with the second set of one or more recipients being a member of a second group of recipients identified in the group membership data.

* * * * *